United States Patent
Kuno et al.

(10) Patent No.: US 8,367,949 B2
(45) Date of Patent: Feb. 5, 2013

(54) ELECTRIC OPERATING DEVICE OF VEHICLE SEAT

(75) Inventors: Satoru Kuno, Aichi-ken (JP); Toshihide Azuma, Aichi-ken (JP); Hisato Shimomura, Miyagi-ken (JP); Jun Yashiro, Ishinomaki (JP); Yukio Kanzaki, Miyagi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 661 days.

(21) Appl. No.: 12/515,060

(22) PCT Filed: Oct. 12, 2007

(86) PCT No.: PCT/JP2007/069943
§ 371 (c)(1),
(2), (4) Date: Jul. 24, 2009

(87) PCT Pub. No.: WO2008/065815
PCT Pub. Date: Jun. 5, 2008

(65) Prior Publication Data
US 2010/0044202 A1    Feb. 25, 2010

(30) Foreign Application Priority Data

Nov. 29, 2006 (JP) ................................. 2006-321582

(51) Int. Cl.
*H01H 9/26* (2006.01)
*H01H 13/72* (2006.01)
*H01H 13/76* (2006.01)

(52) U.S. Cl. .............. 200/5 A; 200/5 R; 200/4; 200/6 A
(58) Field of Classification Search .................... 200/5 A
See application file for complete search history.

(56) References Cited

U.S. PATENT DOCUMENTS 3,483,337 A * 12/1969 Johnstone et al. ............ 200/6 A
5,126,640 A    6/1992 Leroy
(Continued)

FOREIGN PATENT DOCUMENTS

DE    10353403    6/2005
EP    1340647    9/2003
(Continued)

OTHER PUBLICATIONS

English language Abstract of JP 9-22642, Jan. 21, 1997.
(Continued)

*Primary Examiner* — Renee Luebke
*Assistant Examiner* — Lheiren Mae Caroc
(74) *Attorney, Agent, or Firm* — Greenblum & Bernstein, P.L.C.

(57) ABSTRACT

An electric operating device includes an operation member for operating to activate a plurality of electric functions provided at a vehicle seat. The operation member is disposed at a position outside of the vehicle seat allowing operation by a seated person seated on the vehicle seat. The operation member is constructed to be capable of operating to pivot about an axis and operating to move to slide in a diametrical direction. Further, an operation structure for pivoting about the axis for switching a pivoting position of the operation member is configured as an electric function mode switching structure for selecting the electric function as an operational object from the plurality of electric functions. Further, a slide moving operating structure for switching a slide position in the diametrical direction of the operation member is configured as an activation control structure for operating to activate the electric function selected as the operational object.

7 Claims, 13 Drawing Sheets

U.S. PATENT DOCUMENTS

| | | | |
|---|---|---|---|
| 6,262,379 B1 * | 7/2001 | Tajima | 200/5 R |
| 6,953,900 B2 * | 10/2005 | Sottong | 200/5 R |
| 7,282,656 B2 * | 10/2007 | Niiyama | 200/5 R |

FOREIGN PATENT DOCUMENTS

| | | |
|---|---|---|
| JP | 6-48228 | 2/1994 |
| JP | 6-47031 | 6/1994 |
| JP | 9-22642 | 1/1997 |
| JP | 9-109746 | 4/1997 |
| JP | 2001-202851 | 7/2001 |
| JP | 3340883 | 8/2002 |
| JP | 2004-288393 | 10/2004 |
| JP | 2005-313696 | 11/2005 |
| JP | 2006-4091 | 1/2006 |
| JP | 2006-88718 | 4/2006 |

OTHER PUBLICATIONS

English language Abstract of JP 2006-88718, Apr. 6, 2006.
English language Abstract of JP 2005-313696, Nov. 10, 2005.
English language Abstract of JP 2006-4091, Jan. 5, 2006.
English language Abstract of JP 8-268125, Oct. 15, 1996.
English language Abstract of JP 6-48228, Feb. 22, 1994.
English language Abstract of JP 9-109746, Apr. 28, 1997.
English language Abstract of JP 2001-202851, Jul. 27, 2001.
English language Abstract of JP 2004-288393, Oct. 14, 2004.

* cited by examiner

\# ELECTRIC OPERATING DEVICE OF VEHICLE SEAT

TECHNICAL FIELD

The present invention relates to an electric operating device of a vehicle seat. More specifically, the invention relates to an electric operating device of a vehicle seat capable of individually operating to activate a plurality of electric functions provided at a vehicle seat.

BACKGROUND ART

Conventionally, there has been a vehicle seat provided with an electric function capable of electrically adjusting an angle of inclination of a seat back and forward and rearward slide positions of a seat cushion. The electric functions are operated for activation, for example, by a switch arranged at an outer side portion of the seat cushion.

Here, JP-A-2004-288393 discloses a structure of arranging the above-described switch. According to the disclosure, in order to enable to individually adjust attitude positions of the seat back and the seat cushion, a changeover switch for switching an adjustment object and an adjusting switch for adjusting to move the selected object in forward and rearward directions and in upward and downward directions are separately disposed.

Thus, there is a need in the art for an improved electric operating device of a vehicle seat.

SUMMARY OF THE INVENTION

One aspect of the present invention can include an electric operating device of a vehicle seat that includes an operation member for operating to activate a plurality of electric functions provided at the vehicle seat. The operating member is disposed at a position outside of the vehicle seat allowing operation by a seated person seated on the vehicle seat. The operation member is constructed to be capable of operating to pivot about an axis and operating to move to slide in a diametrical direction. Further, an operation structure for pivoting about the axis for switching a pivoting position of the operation member is configured as an electric function mode switching structure for selecting the electric function as an operational object from the plurality of electric functions. Further, a slide moving operating structure for switching a slide position in the diametrical direction of the operation member is configured as an activation control structure for operating to activate the electric function selected as the operational object.

Here, as 'a plurality of electric functions provided at a vehicle seat', the followings may be included. For example, electric functions, such as a position adjusting function enabling to electrically adjust a back leaning angle of a seat back or front and rear slide positions of a seat cushion, and a comfort improving function, such as a lumbar support, a vibrator for massage or the like, for improving comfort when seated are included. Further, with regard to the electric function, 'operating to activate' refers to an operation for switching ON/OFF of the electric function, adjusting strongness or weakness of an output, switching of an operating direction or the like.

By switching the pivoting position by operating to pivot about the axis of the operation member, the electric function that is the operational object is selected from a plurality of electric functions provided at the vehicle seat. Further, by switching the slide position by operating to slide to move the operation member in a diametrical direction, the electric function selected as the operational object is operated for activation. That is, by operating a single operation member, both of selection of the electric function and the activating operation thereof can be carried out. Further, in the case that the number of the electric functions is increased, it can be dealt by increasing the set number of pivoting positions for selecting the electric function by operating to pivot the operation member about the axis.

Further, the operating member may have an indexing portion shaped to be elongated in the diametrical direction, and a direction of the elongated index can be felt by a touch feeling of the indexing portion. The electric function mode switching structure is configured such that the electric function related to the seat back is selected as the indexing portion is oriented to index an upward or downward direction of the vehicle seat to follow the attitude direction of the seat back by the operation for pivoting the operating member about the axis. Further, the electric function mode switching structure is configured such that the electric function related to the seat cushion is selected as the indexing portion is oriented to index a forward or rearward direction of the vehicle seat to follow the attitude direction of the seat back.

As the indexing portion is oriented to such a direction to follow the attitude of the seat back or the seat cushion, the electric function provided to be related to the seat back or the seat cushion that is subjected to be oriented is selected. The direction of elongation in the diametrical direction indexed by the indexing portion can be felt with the touch feeling when the indexing portion is touched. Therefore, because it makes easy to determine if the state is that of selecting the electric function related to the seat back or that of selecting the electric function related to the seat back, the operation for selecting the electric function can be easily performed.

Further, the indexing portion shaped to be elongated in the diametrical direction may be set as an operating portion of the operating member, which is operated to be grasped. The operation member may be configured to be operated by grasping the indexing portion shaped to be elongated in the diametrical direction, and therefore, the operation for pivoting about the axis can be easily performed. In addition, because the indexing portion is directly grasped for operation of pivoting about the axis, the state of selection of the electric function can be recognized as the same time, so that the operation can be further easily performed.

Further, in the state that the indexing portion is oriented to index forward and rearward directions of the vehicle, a central axis for the pivotal movement about the axis of the operating member is set at a position rearwardly of a center of its shape elongated in the forward and rearward directions. According to this construction, because the central axis of the pivotal movement of the operating member about the axis is set at the position described above, it is possible to change the orientation indexed by the indexing portion with an operation feeling like an operation for tilting up and down the seat back relative to the seat cushion. This makes it easy to determine if the state of the indexing portion is that of indexing the seat back or that of indexing the seat cushion.

Further, one of the plurality of electric functions may be set as a positing adjusting function capable of moving, by operating the operating member to slidably move in the diametrical direction, a disposed position of a component of the vehicle seat in the direction of the sliding movement. As the component of the vehicle seat, components, such as the seat back, seat cushion and the head rest as well as the lumbar support that is installed as an additional function may be included. According to this construction, the disposed position of the component of the vehicle seat can be moved in the direction of slidably moving the operating member. Because it is possible to move the component of the vehicle seat in the operating direction of the operating member in this way, the operating direction can be easily imagined, and it is possible to easily perform the operation.

DETAILED DESCRIPTION OF THE INVENTION

An embodiment of the invention will be explained as follows in reference to the drawings.

Embodiment 1

Figure 1:
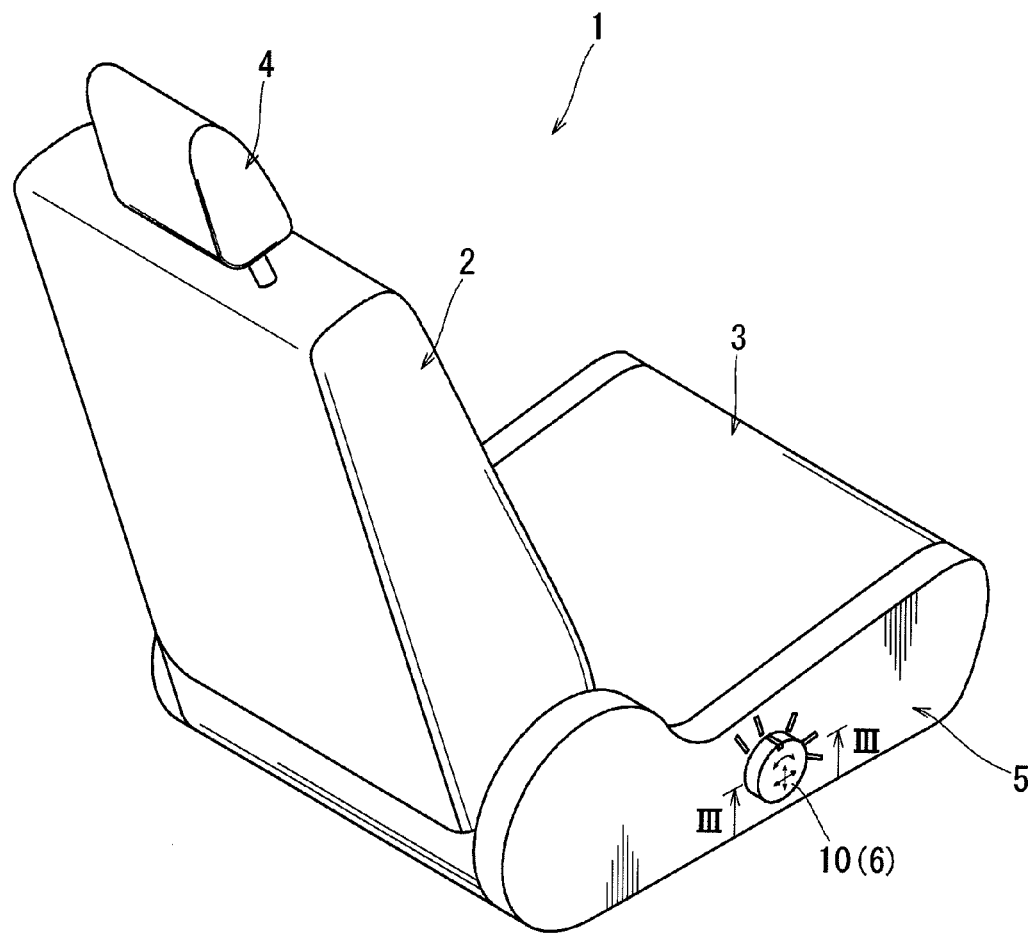
FIG. 1 is a perspective view showing a schematic constitution of an electric operating device of a vehicle seat of Embodiment 1.

First, an electric operating device of a vehicle seat of Embodiment 1 will be explained in reference to FIG. 1 through FIG. 9. As shown in FIG. 1, the vehicle seat 1 is arranged as a driver's seat of a vehicle, including a seat back 2 constituting a back rest, a seat cushion 3 constituting a seating portion, and a head rest 4 constituting a head support. Further, shields 5 are mounted to both side portions in a width direction of the vehicle seat 1 for covering connecting portions between the seat back 2 and the seat cushion 3 from the outer side. Further, an operation member 10 of an electric operating device 6 is disposed on the shield 5 arranged on a vehicle window side (right side in a paper face: outer side).

The operation member 10 is formed to have a shape of a cylinder projecting to an outer side (window side) of the shield 5, and is disposed at a position in a vicinity of a central portion with respect to forward and rearward directions of the seat cushion 3. Therefore, the hands of a seated person seated on the vehicle seat 1 can easily reach the operation member 10, while the operation member 10 is arranged at a narrow gap between the vehicle seat 1 and a door trim 111 (side wall member) of a door 110 on a window side of a vehicle body 100. However, the operation member 10 is made to be able to be operated easily by putting the hand into the gap even if it is arranged within such a narrow gap.

Figure 2:
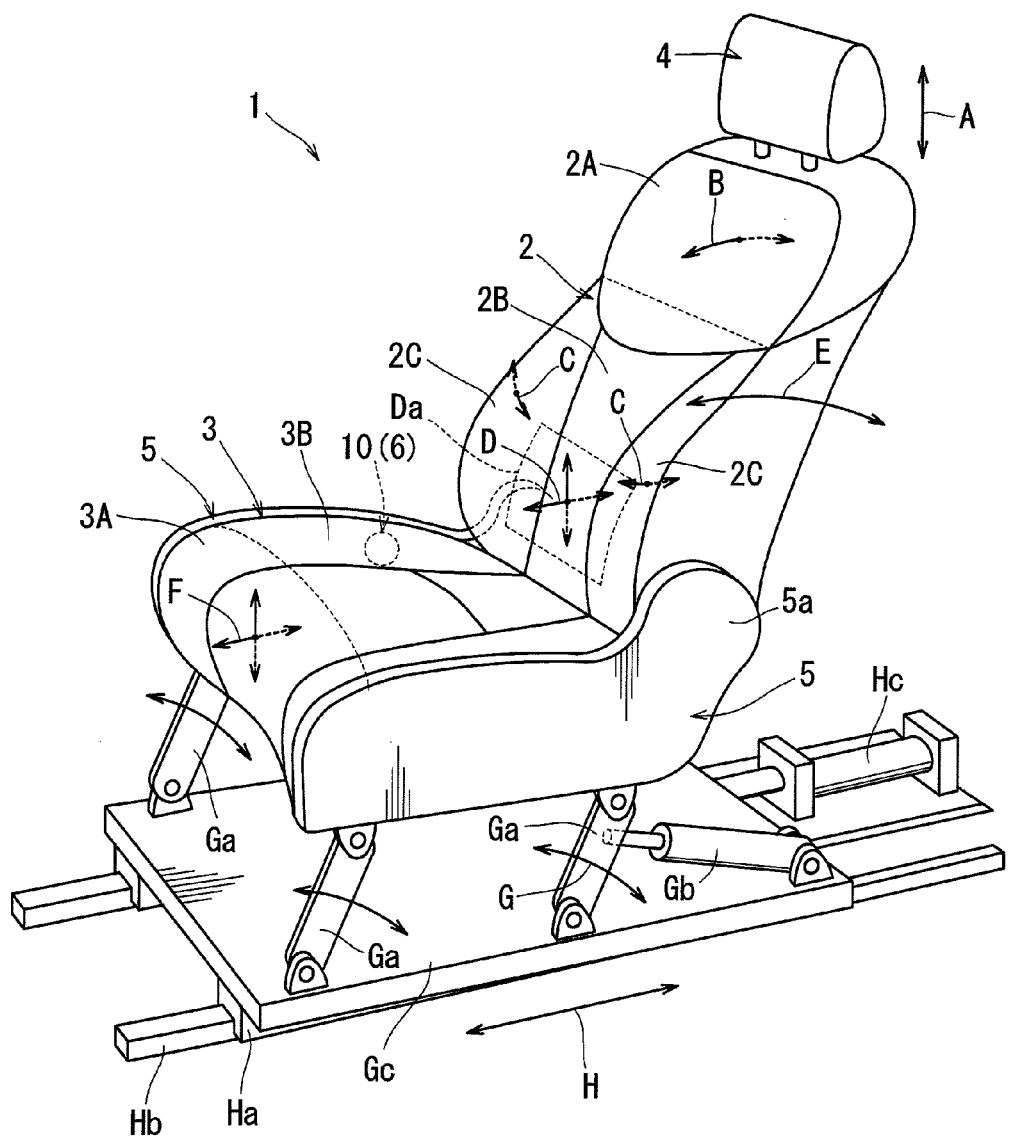
FIG. 2 is a perspective view showing a schematic constitution of electric functions provided at the vehicle seat.

Here, as shown in FIG. 2, the vehicle seat 1 is provided with a plurality of electric functions operated for activation by the operation member 10. Specifically, the electric functions are position adjusting functions capable of moving positions of arrangement of components of the seat back 2 and the seat cushion 3. Here, the above-described respective electric functions will be explained successively.

That is, within the seat back 2, a head rest lifting and lowering device A capable of moving to lift and lower the head rest 4 mounted to an upper face portion thereof. Further, within the seat back 2, a seat back middle folding device B capable of folding a back leaning attitude of a seated person to raise the upper body forward is provided. The seat back middle folding device B can raise the upper body of the seated person forwardly to take a middle folding state by moving an upper body support portion 2A supporting the upper body of the back portion of the seated person to fold forward relative to a lower body support portion 2B supporting the lower body.

Further, within the seat back 2, a side support device C is provided and is capable of supporting both side portions of the seated person by moving forwardly to deform both side portions 2C, 2C in the width direction in such manner that the both side portions 2C, 2C are brought to be positioned inwardly. Further, within the seat back 2, a lumbar support device D enabling adjustment of a height position and forward and rearward positions for placing a support plate Da on the waist portion is provided as a device for increasing a strength of supporting the waist portion of the seated person. Further, at a connecting portion between the seat back 2 and the seat cushion 3, a reclining device E enabling to adjust a back leaning angle of the seat back 2.

Further, within the seat cushion 3, a cushion front portion movable device F is provided and is capable of adjusting a length in forward and rearward directions of the seat cushion 3 and a height position of a seat face of a front portion 3A divided in forward and rearward directions by moving the front portion 3A forwardly, rearwardly, upwardly and downwardly relative to a rear portion 3B.

Further, on the lower side of the seat cushion 3, a lifter device G capable of adjusting a height position of the seat cushion 3 (the entire vehicle seat 1) relative to a vehicle floor face is provided. The lifter device G is constituted to adjust a seating height position of the seat cushion 3 due to the operation of a link mechanism portion Ga connecting between a moving base Gc installed on the vehicle floor and the seat cushion 3 to pivot to rise and fall by the operation of an actuator Gb.

Further, a lower portion of the seat cushion 3 is provided with a slide device H capable of sliding to move a seating position of the seat cushion 3 (the entire vehicle seat 1) relative to the vehicle floor face. The slide device H has a constitution in which an upper rail Ha disposed to be fixed integrally with a lower face portion of the above-described moving base Gc is fitted to a lower rail Hb disposed to be fixed onto the vehicle floor face to be able to slide to move in forward and rearward directions of the vehicle. Further, the upper rail Ha is operated to slidably move in forward and rearward directions by the operation of an actuator Hc.

According to the electric functions mentioned above, the operational object is selected by operating to pivot the operation member 10 about the axis. Further, according to the electric functions, the electric function selected as the operational object is operated for activation by operating to slidably move the operation member 10 in a diametrical direction.

Figure 4:
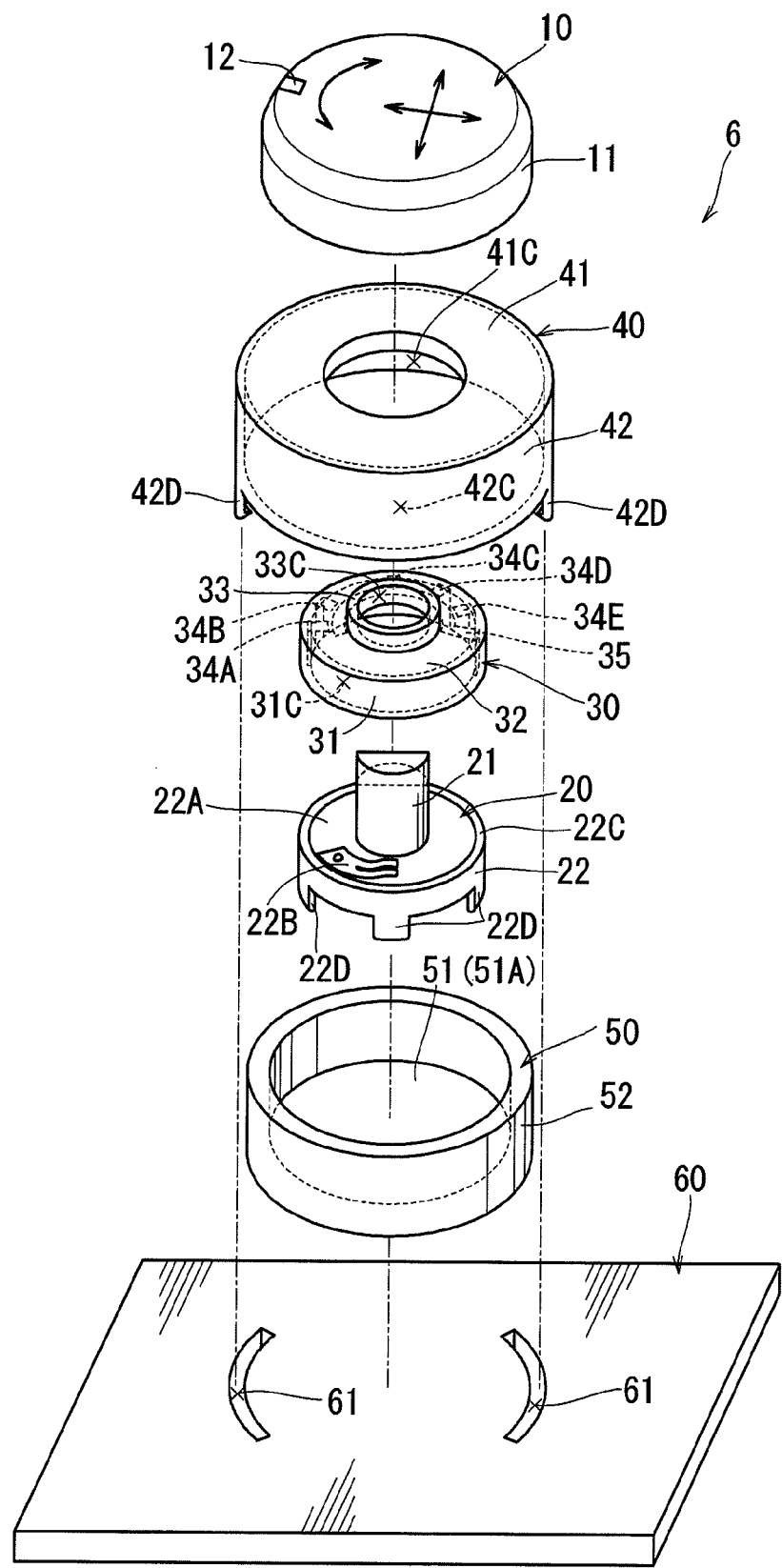
FIG. 4 is an exploded perspective view of the electric operating device.

The constitution of the electric operating device 6 will be concretely explained as follows. As shown in FIG. 4, the electric operating device 6 is constituted to have the operation member 10, a rotating member 20, a slide member 30, an outer peripheral ring 40, an inner peripheral ring 50, and a base 60. Further, a basic constitution of the electric operating device 6 is a publicly-known constitution disclosed in a document, such as JP-A-2005-317377 or the like, and therefore, in the following, the construction of a characteristic portion of the invention will be explained in detail.

First, the operation member 10 will be explained. The operation member 10 is formed in a shape of cylinder, and is assembled with the vehicle seat 1 by being fitted into the rotating member 20. Therefore, the operation member 10 is constructed to be capable of carrying out the pivoting operation about the axis and the slide moving operation in the diametrical direction.

Figure 3:
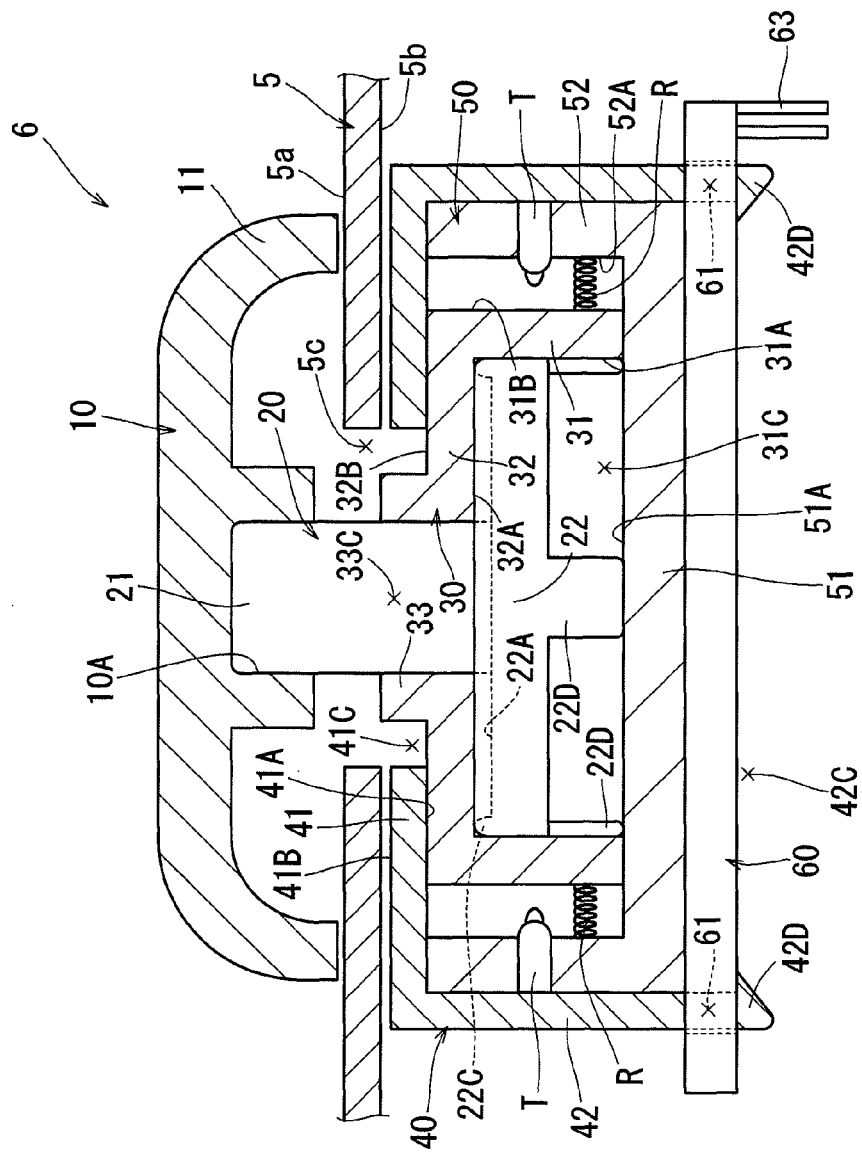
FIG. 3 is a sectional view taken along line III-III in FIG. 1 and showing an internal structure of the electric operating device.

Specifically, a bottom face portion of the shape of the cylinder of the operation member 10 is formed with a fitting groove 10A having a half moon cross section, although illustration thereof is omitted in FIG. 3. Further, a front end of the rotating member 20 is formed with a fitting portion 21 (see FIG. 4) having a half moon cross section capable of fitting with the fitting groove 10A. Therefore, by fitting the fitting portion 21 to the fitting groove 10A, the operation member 10 is integrally connected with the rotating member 20.

Here, the operation member 10 is mounted such that a peripheral edge portion 11 thereof is brought into a non-contact condition with an outer side face 5a of the shield 5. Therefore, the operation member 10 can be operated smoothly without receiving a sliding friction by the contact with the shield 5 when it is operated to pivot about the axis or when it is operated to slidably move in the diametrical direction.

Figure 5:
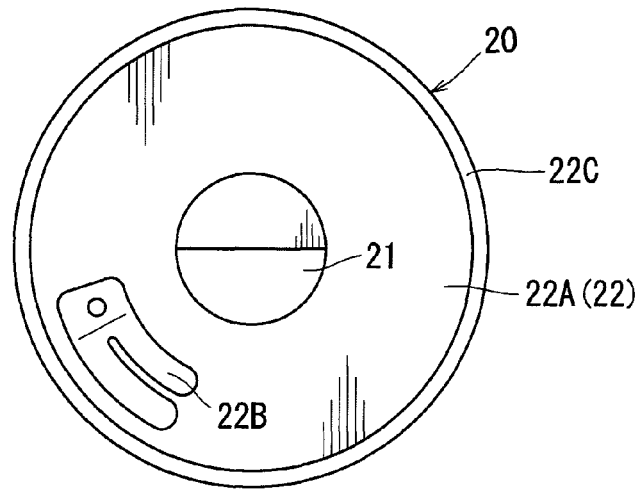
FIG. 5 is a plan view of a rotating member.

Next, the rotating member 20 will be explained. As shown in FIG. 5, the rotating member 20 includes a base seat portion 22 in a shape of a circular plate and the fitting portion 21 in a shape of a cylindrical rod formed on the base seat portion 22. Further, the fitting portion 21 is configured to have a configuration in which its front end portion is partially hollowed in the half moon shape as described above and is fitted to the fitting groove 10A (see FIG. 4) of the operation member 10. Therefore, the rotating member 20 is operated to pivot about the axis or operated to slide to move in the diametrical direction integrally with the operation member 10.

Further, on an illustrated upper face (seat face 22A) of the base seat portion 22, a slider 22B in a shape of a thin curved plate constituted by an electrically conductive member is provided. According to the slider 22B, one end thereof is fixedly attached to the seat face 22A and other end thereof is shaped to be warped back toward an upper side of the paper face. Further, an end portion on a side of a free end warped up to the upper side has a shape divided in a bifurcated manner. As shown in FIG. 5, the slider 22B is provided on the seat face 22A only at one position in a circumferential direction.

Further, referring back to FIG. 4, a peripheral edge portion of the base seat portion 22 is formed with a an annular projected edge 22C projecting upward from the seat face 22A. The projected edge 22C is constituted to contact with an inner bottom face 32A of a stepped portion 32 in the state that the rotating member 20 is assembled with the slide member 30 as described later in FIG. 3.

Further, as shown in FIG. 3, a plurality of leg portions 22D—are formed on the peripheral portion of the base seat portion 22 to extend downwardly. These leg portions 22D are formed to be disposed uniformly at four positions in the circumferential direction of the base seat portion 22. These leg portions 22D—are configured to contact with the inner bottom face 32A of the stepped portion 32 in the assembled state of the rotating member 20 with the slide member 30.

Next referring back to FIG. 4, the slide member 30 will be explained. The slide member 30 is formed in a shape of a stepped cylinder and includes a barrel portion 31 in a shape of a cylinder and the stepped portion 32 and a neck portion 33. By inserting the above-described rotating member 20 from an opening portion 32C opened to a lower side as illustrated of the barrel portion 31, the rotating member 20 is assembled within the cylinder of the slide member 30

In detail, as shown in FIG. 3, the rotating member 20 is assembled with the slide member 30 in the state that the fitting portion 21 projects upward from an opening portion 33C within the cylinder of the neck portion 33. Therefore, the rotating member 20 is assembled in the state that the projecting edge 22C contacts with the inner bottom face 32A of the stepped portion 32.

Here, the size of an inner diameter of the slide member 30 is set to a size for loosely fitting the rotating member 20 within the cylinder. Therefore, although the slide member 30 does not follow the relative pivotal movement about the axis of the rotating member 20, with regard to the sliding movement of the rotating member 20 in the diametrical direction, the slide member 30 is slidably moved in the diametrical direction integrally therewith. At this occasion, the rotating member 20 is pivoted about the axis while causing the projecting edge 22C to slide on the inner bottom face 32A of the stepped portion 32 of the slide member 30.

Figure 6:
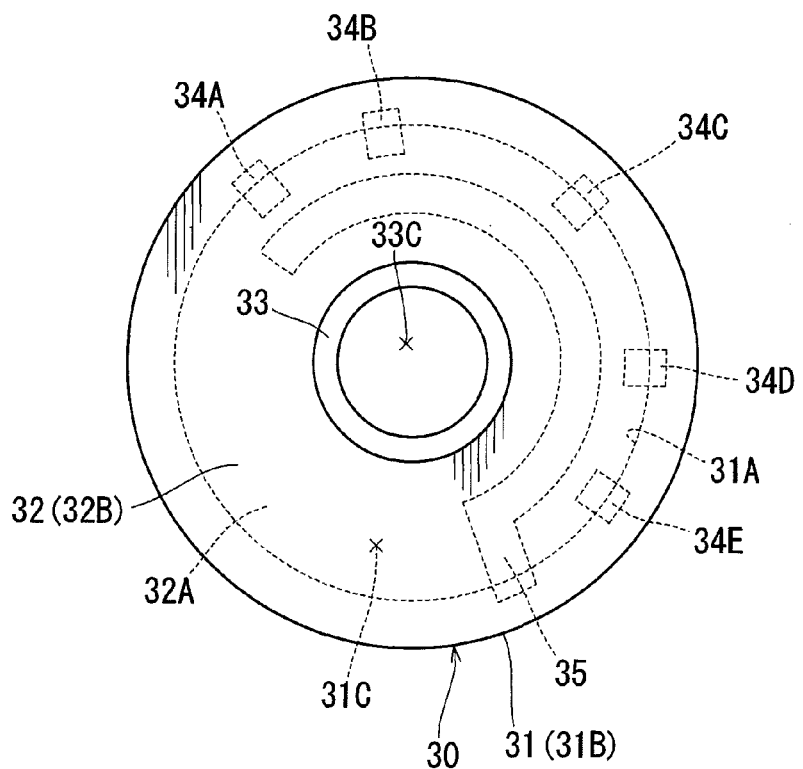
FIG. 6 is a plan view of a slide member.

Here, as shown in FIG. 6, on the inner bottom face 32A of the stepped portion 32, fixed contacts 34A through 34E and a common contact 35 in shapes of flat faces and constituted by electrically conductive members are provided integrally and in flush therewith. The fixed contacts 34A through 34E are disposed to be arranged at five positions in a circumferential direction on the inner bottom face 32A.

On the other hand, the common contact 35 is formed in such a manner as drawing an arc in a circumferential direction passing inner sides of the fixed contacts 34A through 34E with respect to the diametrical direction. The fixed contacts 34A through 34E and the common contact 35 are arranged to be spaced from each other and are electrically connected to terminals 63 provided at the base 60 explained later by wiring through passing an inner peripheral face 31A of the barrel portion 31 of the slide member 30.

Figure 7:
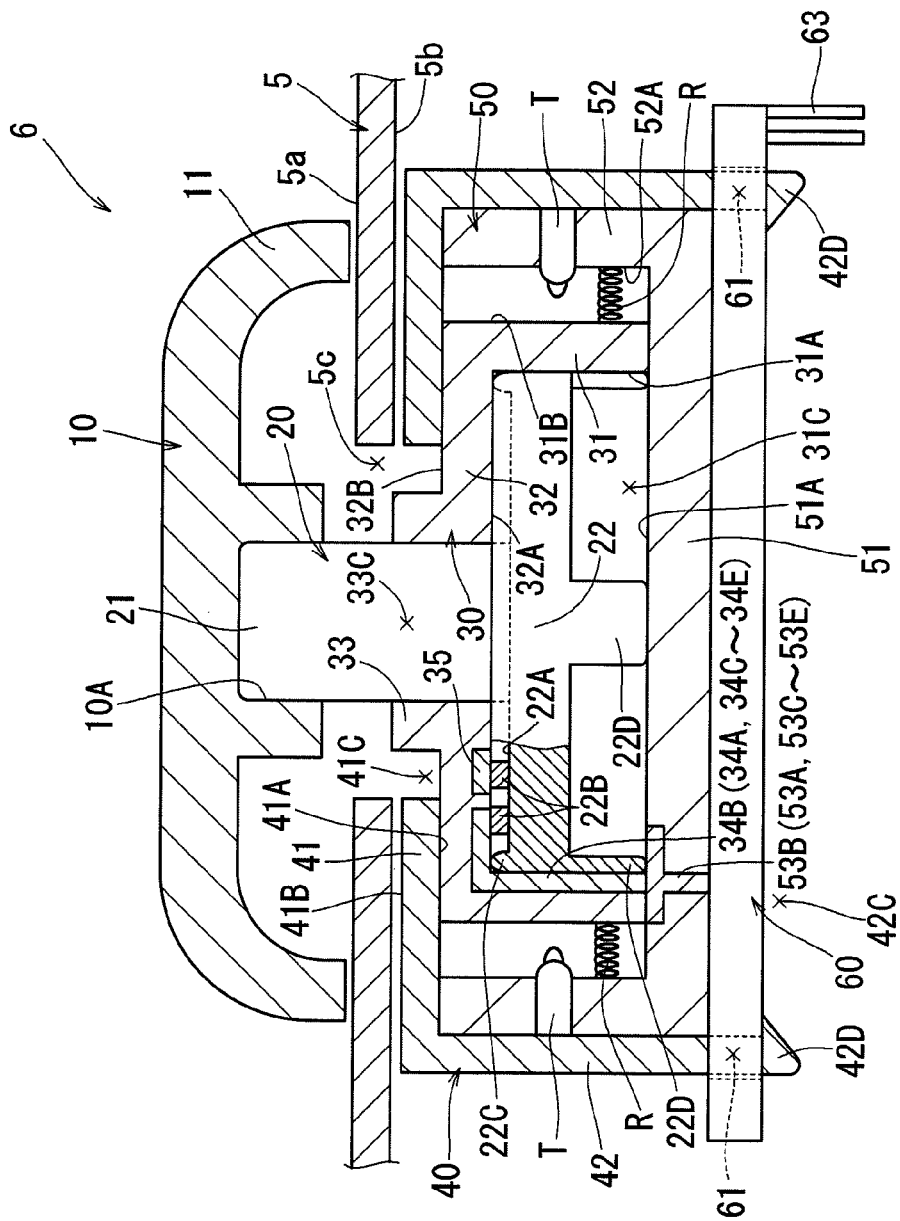
FIG. 7 is a sectional view showing a state in which a slider and a fixed contact are aligned with each other.

In the assembled state, the slide member 30 constituted as described above is in the state of being pressed and deformed to be flexed as the slider 22B provided on the seat face 22A of the rotating member 20 is pressed by the inner bottom face 32A of the stepped portion 32 as shown in FIG. 7. Therefore, the slider 22B is held in the state that its bifurcated end portions are resiliently pressed against any of the common contact 35, and the fixed contacts 34A through 34E provided on the inner bottom face 32A.

Further, when the pivoting operation about the axis of the rotating member 20 is carried out under this state, one of the bifurcated ends of the slider 22B slides in the circumferential direction along the configuration of the common contact 35, while the other of the bifurcated ends slides on the fixed contacts 34A through 34E in the circumferential direction to successively pass them. Therefore, according to the slider 22B, as the rotating member 20 is operated to pivot about the axis, the press contact state with the fixed contacts 34A through 34E is successively switched while the press contact state with the common contact 35 is always maintained.

Here, FIG. 7 shows a state where the slider 22B is aligned with the fixed contact 34B. Under this state, the slider 22B, and the fixed contact 34B and the common contact 35 are brought into a state where they are in press contact with each other to be able to electrically conduct with each other. Further, the rotating member 20 is constituted such that at pivoting positions, where the slider 22B aligns with any of the fixed contacts 34A through 34E, a constant click feeling is given for its pivoting operational force. Therefore, the pivoting operation for bringing the rotating member 20 to align with the above-described pivoting positions can be easily performed.

Next referring back to FIG. 4, the outer peripheral ring 40 will be explained. The outer peripheral ring 40 is formed in a shape of a cylindrical tube having a top plate portion 41. According to the outer peripheral ring 40, the rotating member 20 and the slide member 30 are assembled within the cylindrical tube as the rotating member 20 and the slide member 30 mentioned above are inserted into a cylindrical tubular portion 42 from a lower opening portion 42C. In detail, as shown in FIG. 4, the slide member 30 is assembled within the cylindrical tube of the outer peripheral ring 40 by bringing the neck portion 33 into an inserted state into a hole of a through hole 41C formed in the top plate portion 41 and by bringing the upper face 32B of the stepped portion 32 into a face contact state with the inner bottom face 41A of the top plate portion 41 of the outer peripheral ring 40.

Further, the outer peripheral ring 40 is assembled into a state where the through hole 41C formed in the top plate portion 41 axially aligns with a through hole 5c formed in the shield 5. According to the outer peripheral ring 40, an upper face 41B thereof is arranged away from an inner side face 5b of the shield 5 so as not to contact therewith.

Further, the outer peripheral ring 40 is attached to the base 60 by fitting two engaging claws 42D, 42D, which are formed to project at portions on a side of a lower edge of the cylindrical portion 42, into engaging holes 61, 61 formed through the base 60 described later and so as to be engaged therewith, respectively. As shown in FIG. 3, the outer peripheral ring 40 is attached to the base 60 in the state that the rotating member 20 and the slide member 30 described above as well as the inner peripheral ring 50 described later are assembled within the cylindrical tube.

Here, the cylindrical tubular portion 42 of the outer peripheral ring 40 is formed to have a large inner diameter size permitting the barrel portion 31 of the slide member 30 to slide in a diametrical direction within the cylindrical tube. Further, the through hole 41C formed in the top plate portion 41 is also formed to have a large diameter size permitting the neck portion 33 to move when the above-described slide member 30 is slid to move. Further, when the slide member 30 is moves to slide, the slide member 30 moves to slide in the diametrical direction while an upper face 32B of the stepped portion 32 slides on the inner bottom face 41A of the top plate portion 41 of the outer peripheral ring 40.

Next, referring back to FIG. 4, the inner peripheral ring 50 will be explained. The inner peripheral ring 50 is formed in a shape of a cylindrical tube having the bottom plate portion 51. The inner peripheral ring 50 is assembled within the cylindrical tube as it is inserted into the cylindrical tubular portion 42 of the outer peripheral ring 40 from the lower opening portion 42C. Therefore, as shown in FIG. 4, the inner peripheral ring 50 is assembled in such a state that the slide member 30 and the rotating member 20 described above are interposed between the bottom plate portion 51 and the ceiling plate portion 41 of the outer peripheral ring 40.

In the assembled state of the inner peripheral ring 50, the leg portions 22D or the rotating member 20 and a lower face of the barrel portion 31 of the slide member 30 are in contact with the top plate portion 41 and the bottom plate portion 51. Therefore, the rotating member 20 is brought into the state where the annular projected edge 22C contacts with the inner bottom face 32A of the stepped portion 32 of the slide member 30, so that the slider 22B is held to be pressed to contact with the inner bottom face 32A.

Further, face portions on upper and lower sides of the barrel portion 31 of the slide member 30 are in face contact with the top plate portion 41 and the bottom plate portion 51. Therefore, the slide member 30 can slide to move without rattling in the diametrical direction between the inner peripheral ring 50 and the outer peripheral ring 40.

Here, four compression springs R•• are provided between the cylindrical tubular portion 52 of the inner peripheral ring 50 and the barrel portion 31 of the slide member 30. The compression springs R—are arranged uniformly at four positions in the circumferential direction to be able to urge the barrel portion 31 toward a center position with respect to a radius direction of the cylindrical tubular portion 52. Therefore, when the slide member 30 is slid in any of diametrical directions against the urging of the compression springs R••, stopping the slide moving operation causes the slide member 30 to return to the center position of the cylindrical tubular portion 52 due to the urging by the compression springs R••.

Further, as shown in FIG. 3, four slide detecting switches T•• are arranged uniformly in a circumferential direction between the cylindrical tubular portion 52 and the barrel portion 31. The slide detecting switches T•• are disposed to be embedded into the cylindrical tubular portion 52 and are in the state that their front end portions project radially inwardly from an inner peripheral face 52A. Here, the four slide detecting switches T•• are arranged at two positions to be oriented in forward and rearward directions of the vehicle seat 1 (see FIG. 1) and two positions to be oriented in upward and downward directions.

Figure 9:
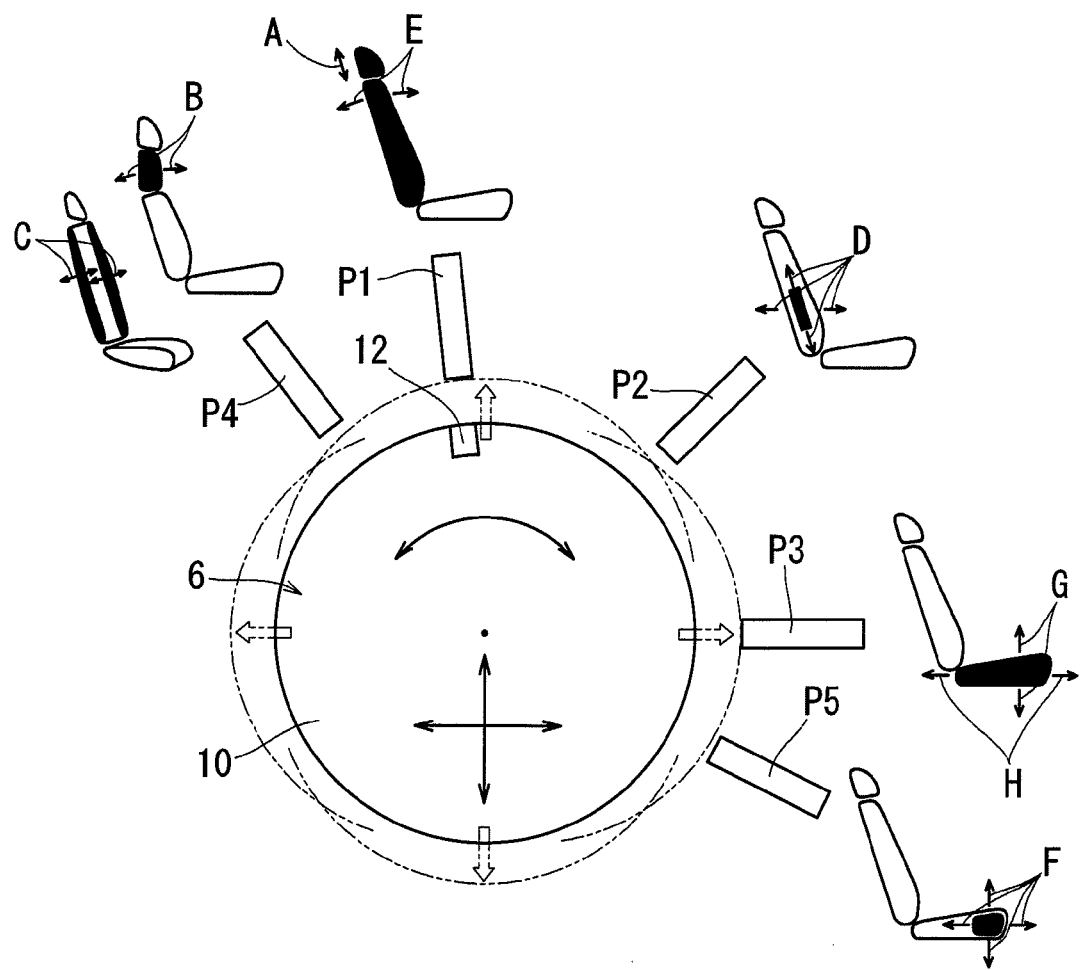
FIG. 9 is a schematic view showing an electric function mode switching structure and an operation control structure of the operation member.

Therefore, by slidably moving the operation member 10 in any of forward, rearward, upward and downward directions of the vehicle seat 1 (see FIG. 1), as shown in FIG. 9, the outer peripheral face 31B of the barrel portion 31 of the slide member 30 is pushed to be contacted with any of the slide detecting switches T••, so that its slide moving operation is detected.

Here, as shown in FIG. 7, stationary placed contacts 53A through 53E constituted by electrically conductive members are provided on the upper face 51A of the bottom plate portion 51. The stationary placed contacts 53A through 53E are disposed at five positions in the circumferential direction, at which the above-described fixed contacts 34A through 34E are disposed. The stationary placed contacts 53A through 53E always electrically conductively contact with lower end portions of the respective fixed contacts 34A through 34E mentioned above, which extend to lower edge side portions of the barrel portion 31 of the slide member 30 sliding on the upper face 51A of the bottom plate portion 51.

The stationary placed contacts 53A through 53E are formed to spread in a direction within a plane of the upper face 51A to be able to always contact with the respective fixed contacts 34A through 34E even when the slide member 30 is moved to slide in forward, rearward, upward and downward directions on the upper face 51A of the bottom plate portion 51. Further, although the illustration is omitted, a stationary placed contact similar to the stationary placed contacts 53A through 53E is provided also at a position for contacting with a lower end portion of the common contact 35 extended to a portion on the lower edge side of the barrel portion 31 of the slide member 30.

Further, referring back to FIG. 4, the base 60 will be explained. The base 60 is formed in a shape of a plate and is integrally assembled with the outer peripheral ring 40 by fitting the engaging claws 42D, 42D of the above-described outer peripheral ring 40 into two engaging holes 61, 61 formed to penetrate the plate in a thickness direction.

Here, as shown in FIG. 3, the base 60 is provided with the terminals 63 electrically connected to the slide detecting switches T•• embedded into the cylindrical tubular portion 52 of the inner peripheral ring 50, the fixed contacts 34A through 34E (see FIG. 7) embedded into the stepped portion 32, and the common contact 35.

Figure 8:
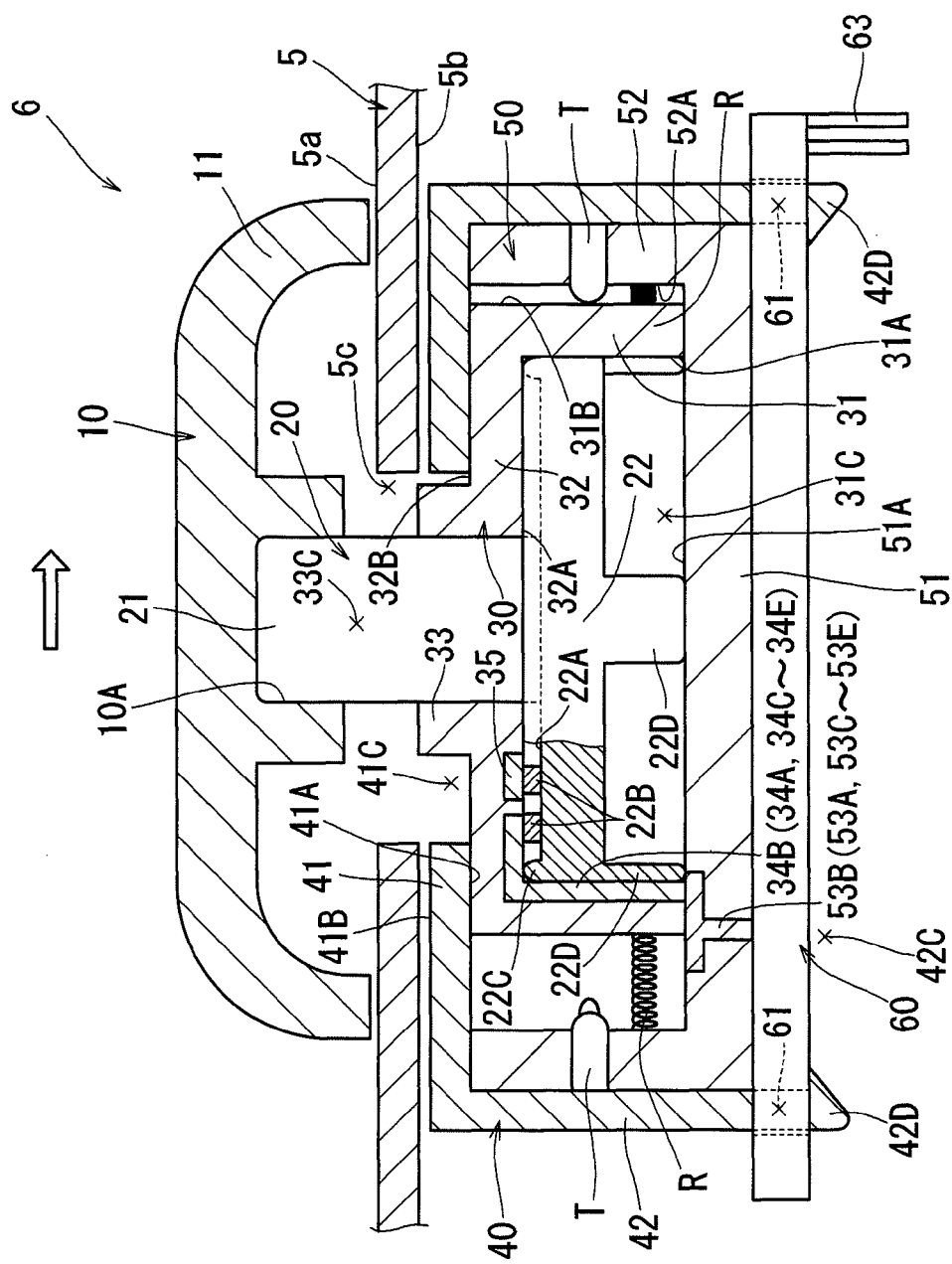
FIG. 8 is a sectional view showing a state in which the operation member has moved to slide rightward in the paper face from the state of FIG. 7.

As shown in FIG. 8, the terminal 63 are configured to transmit slide position information when any of the slide detecting switches T•• is pushed down by the operation of slidably moving the operation member 10 in the diametrical direction and rotational position information when the slider 22B is brought to electrically conductively contact in face with any of the common contact 35 and the fixed contacts 34A through 34E by the operation of pivoting the operation member 10 about the axis, to the control portion not shown.

According to the electric operating device 6 having the above-described constitution, by the operation of pivoting the operation member 10 about the axis or sliding to move the operation member 10 in the diametrical direction, a state of selecting the electric function is switched or the electric functions are operated for activation as follows. Here, as shown in FIG. 9, five positions P1 through P5 are set for pivoting positions of the operation member 10. The positions P1 through P5 are pivoting positions at which the slider 22B and the fixed contacts 34A through 34E are brought to electrically conductively contact with each other in FIG. 7 when the operation member 10 is set to the pivoting positions.

Here, the position P1 is set to a pivoting position at which an index portion 12 set to the operation member 10 is on the upper side and directed slightly rearwardly to indicate an attitude direction of the seat back 2 normally used. Further, the position P2 is set to a pivoting position substantially at a midpoint between the position P1 and a position P3 described later. Further, the position P3 is set to a pivoting position at which the index portion 12 is directed forwardly to indicate an attitude direction of the seat cushion 3.

Further, the position P4 is set to a pivoting position at which the index portion 12 is directed to the rear side relative to the position P1, that is, a pivoting position indicating a direction of reclining the seat back 2 rearwardly. Further, the position P5 is set to a pivoting position at which the index portion 12 is directed downward relative to the position P3, that is, a pivoting position of indicating a direction of downwardly inclining the attitude direction of the seat cushion 3.

First, in a state that the index portion 12 of the operation member 10 is set to the position P1 indicating the attitude direction of the seat back 2, based on the rotational position information, a state of selecting the reclining device E and the head rest lifting and lowering device A as operational objects is resulted.

Further, in this state, when the operation member 10 is slid to move forwardly of the vehicle seat 1 (see FIG. 2), that is, rightwardly in the paper face (diametrical direction) of FIG. 9, the reclining device E is electrically operated, and the back leaning angle of the seat back 2 is varied in a forwardly tilting direction that is the same as the operating direction of the operation member 10. Thus, when the above slide moving operation is performed, the slide detection switch T (see FIG. 8) disposed on the side of its movement is pushed down, and based on this slide position information, the reclining device E is electrically operated.

Further, when the slide moving operation of the operation member 10 is stopped, the operation member 10 is returned to the center position taken before the operation, and the operation of the reclining device E is stopped. Further, when the operation member 10 is moved to slide rearwardly of the vehicle seat 1 (see FIG. 2), that is, leftwardly in the paper face (diametrical direction) of FIG. 9, based on the slide position information, the back leaning angle of the seat back 2 is varied in a rearwardly tilting direction same as the operation direction of the operation member.

Figure 12:
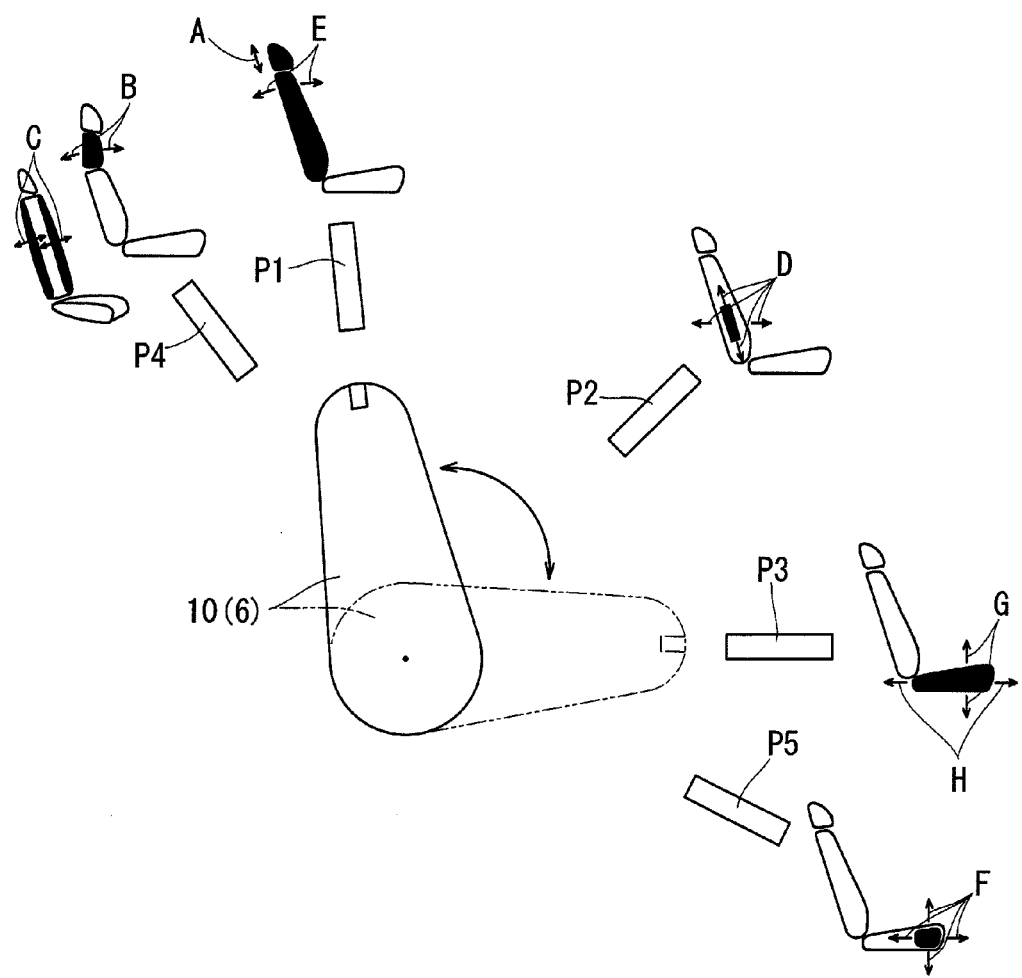
FIG. 12 is a structural view showing an electric function mode switching structure of an electric operation device of a vehicle seat of Embodiment 3.

Further, when the operation member 10 is slid to move upward of the vehicle seat 1 (see FIG. 2), that is, upwardly of the paper face of FIG. 12 (diametrical direction), based on the slide position information, the head rest lifting and lowering device A is electrically operated, and a height position of the head rest 4 is pushed up upwardly same as the operating direction of the operation member 10.

Further, when the slide moving operation of the operation member 10 is stopped, the operation member 10 is returned to the center position taken before the operation, and the operation of the head rest lifting and lowering device A is stopped. Further, when the operation member 10 is slid to move downwardly of the vehicle seat 1 (see FIG. 2), that is, downwardly in the paper face of FIG. 9 (diametrical direction), based on the slide position information, the height position of the head rest 4 is pulled down downwardly same as the operating direction of the operation member 10.

Next, when the index portion 12 is set to the position P2 by operating to pivot the operation member 10 about the axis, based on the rotational position information, a state of selecting the lumbar support device D as the operational object is resulted. Further, in this state, when the operation member 10 is slid to move in the forward, rearward, upward or downward direction with respect to the vehicle seat 1 (see FIG. 2), based on the slide position information, the lumbar support device D is electrically operated.

Therefore, a position of the support plate Da supporting the waist portion of the seated person is operated to move in the forward, rearward, upward or downward direction same as the operating direction of the operation member 10. Further, by stopping the slide moving operation of the operation member 10, similar to the above-described operation structure, the operation of the lumbar support device D is stopped.

Next when the index portion 12 is set to the position P3 indicating the attitude direction of the seat cushion 3 by operating to pivot the operation member 10 about the axis, based on the rotational position information, a state of selecting the slide device H and the lifter device G as the operational objects is resulted.

Further, in this state, when the operation member 10 is slid to move forwardly or rearwardly of the vehicle seat 1 (see FIG. 2), based on the slide position information, the slide device H is electrically operated. Therefore, a position of the seat cushion 3 (the entire vehicle seat 1) opposed to the vehicular floor face is varied by the sliding movement in the forward or rearward direction same as the operating direction of the operation member 10.

Further, when the operation member 10 is slid to move to upwardly or downwardly of the vehicle seat 1 (see FIG. 2), based on the slide position information, the lifter device G is electrically operated. Therefore, the height position of the seat cushion 3 (the entire vehicle seat 1) opposed to the vehicular floor face is operated to move in the upward or downward direction same as the operating direction of the operation member 10. Further, by stopping the slide moving operation of the operation member 10, similar to the above-described operation structure, the operation of the slide device H or the lifter device G is stopped Next when the index portion 12 is set to the position P4 indicating the position directed rearwardly of the seat back 2 by operating to pivot the operation member 10 about the axis, based on the rotational position information, a state of selecting the seat back middle folding device B and the side support device C as the operational objects is resulted.

Further, in this state, when the operation member 10 is slid to move forwardly or rearwardly of the vehicle seat 1 (see FIG. 2), based on the slide position information, the seat back middle folding device B is electrically operated. Therefore, the upper body support portion 2A of the seat back 2 supporting the upper body of the back portion of the seated person is moved relative to the lower body support portion 2B to fold in the forward direction or is returned in the rearward direction same as the operating direction of the operation member 10.

Further, when the operation member 10 is slid to move upwardly or rearwardly of the vehicle seat 1 (see FIG. 2), based on the slide position information, the side support device C is electrically operated. Therefore, both side portions 2C, 2C in the width direction of the seat back 2 are deformed to move forwardly in such a manner that they move toward each other to the inner side, or return rearwardly. Further, similar to the above-described operation structure, the operation of the seat back middle folding device B or the side support device C is stopped by stopping the slide moving operation of the operation member 10.

Next, when the index portion 12 is set to the pivoting position of the position P5 by operating to pivot the operation member 10 about the axis, based on the rotational position information, a state of selecting the cushion front portion movable device F as the operational object is resulted. Further, in this state, when the operation member 10 is moved forwardly or rearwardly of the vehicle seat 1 (see FIG. 2) or upwardly or downwardly of the vehicle seat 1, based on the slide position information, the cushion front portion movable device F is electrically operated.

Therefore, the front portion 3A of the seat cushion 3 is operated to move relative to the rear portion 3B in the forward or rearward direction or upward or downward direction same as the operation direction of the operation member 10. Further, similar to the above-described operation structure, by stopping the slide moving operation of the operation member 10, the operation of the cushion front portion movable device F is stopped.

Subsequently, a method of use of this embodiment will be described. Thus, as shown in FIG. 1, in order to operate for activation of any of the electric functions provided at the vehicle seat 1, the electric function intended to be activated is selected by the operation for pivoting the operating member 10 about the axis. For example, setting the index portion 12 to the pivoting position P1 by operating to pivot the operating member 10 about the axis may result in the state of selecting the reclining device E and the head rest lifting and lowering device A as the operational objects.

Next, the operating member 10 is moved to slide in the forward or rearward direction or the upward or downward direction of the vehicle seat (see FIG. 1) for operating to activate the electric functions selected as the operational objects. Therefore, each of the selected electric functions is operated for activation based on the slide position information to which the operating member 10 has been operated to slidably move.

For example, by operating to slidably move the operating member 10 in the state where the reclining device E and the head rest lifting and lowering device A have been selected as the operational objects as shown in FIG. 9, the height position of the head rest 4 or the back leaning angle position of the seat back 2 are operated to be moved in the same direction as the direction in which the operation member 10 has been operated.

In this way, according to the electric operating device of the vehicle seat of this embodiment, by operating to pivot the operation member 10 about the axis, it is possible to select an operational object from among the plurality of the electric functions. Further, by operating to slide to move the operation member 10 in the diametrical direction directly after that, the electric function selected as the operational object is operated for activation. Therefore, in the case that the number of the electric functions is increased, it can be dealt by increasing the set number of the pivoting positions for selecting the electric functions by the pivoting operation about the axis of the operation member 10.

Further, because the selection of the electric function and the operation for activation thereof can be continuously made without changing the hand from that grasping the operating member 10 to the other, the operation can be easily performed without need of groping for the other operation switch. Further, because it is possible to move a component of the vehicle seat 1, such as the seat back 2 and the head rest 4 or the like, in a direction that is the same as the direction in which the operation member 10 has been moved to slide, it is possible to easily imagine the operational direction intended for movement, and the operation can be easily performed.

Further, the operating member 10 is configured such that a constant click feeling is given against the operational force for pivoting it when it is set to each of the positions P1-P5. Therefore, it is possible to easily position the operating member 10 at a target pivoting position, for example, by pivoting the operating member 10 in the pivoting direction of one side as far as it goes, and by gradually returning the operation for pivoting about the axis.

Embodiment 2

Subsequently, an electric operating device of a vehicle seat of Embodiment 2 will be explained with reference to FIG. 10 through FIG. 11. Further, in the following explanation, portions having constitutions and operations substantially the same as those of the electric operating device of the vehicle seat explained in Embodiment 1 are labeled with the same symbols, an explanation thereof will be omitted, and a detailed explanation will be given to different portions.

Figure 10:
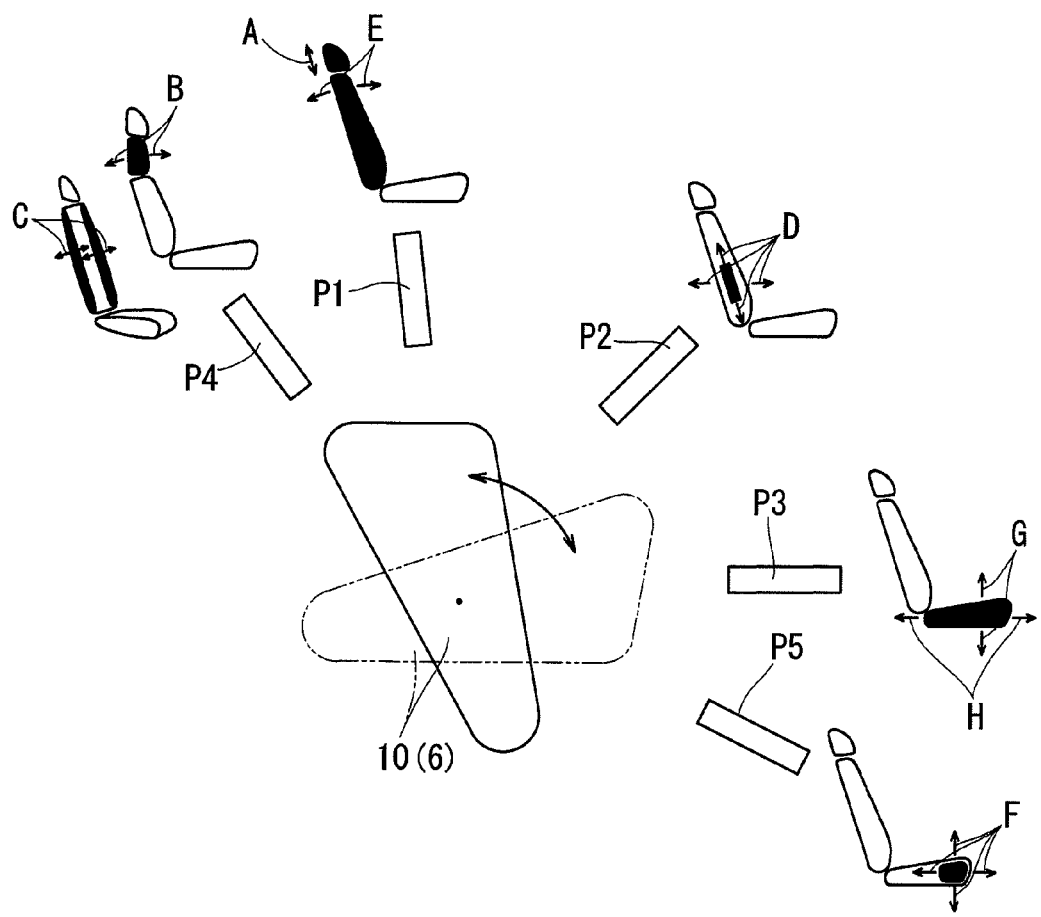
FIG. 10 is a structural view showing an electric function mode switching structure of an electric operation device of a vehicle seat of Embodiment 2.
Figure 11:
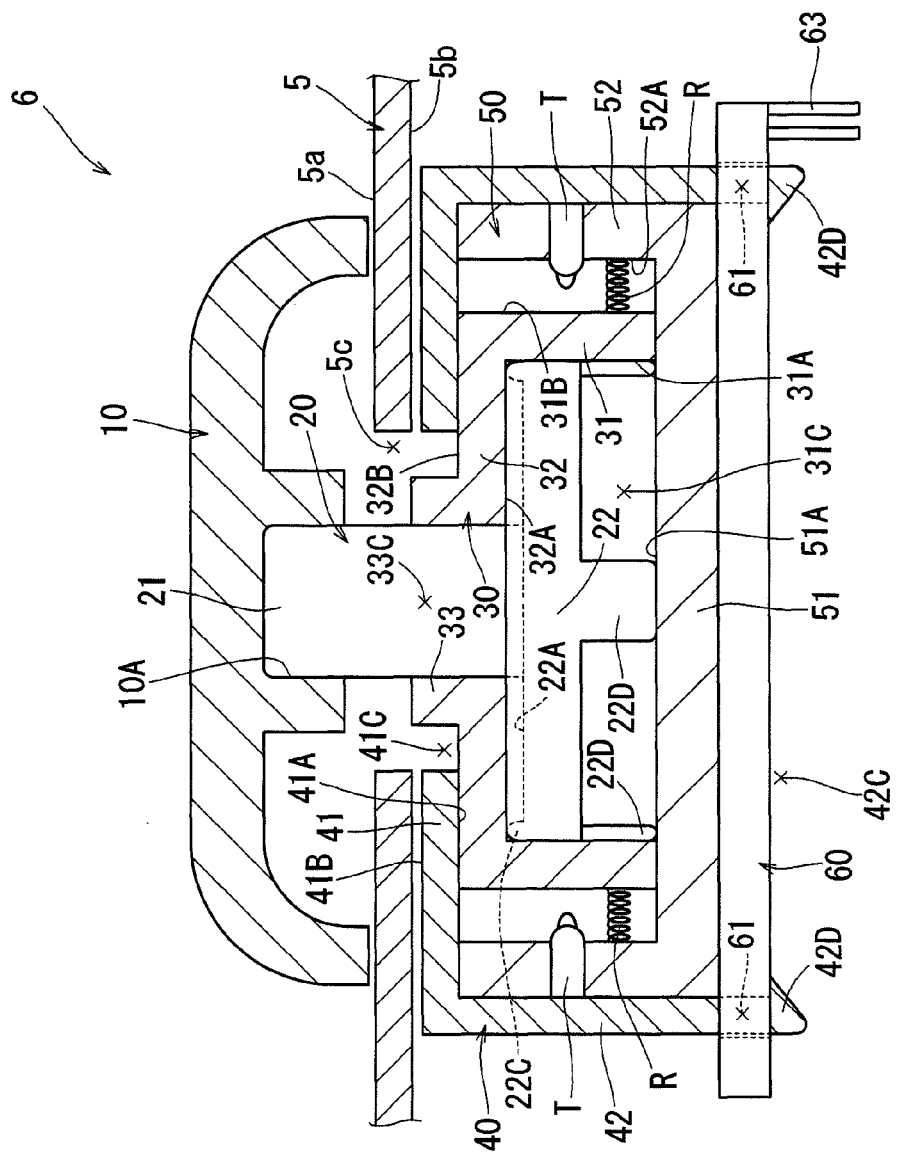
FIG. 11 isasectionalviewshowinganinternalstructureoftheelectricoperationdevice.

That is, as shown in FIG. 10, the operation member 10 of the electric operating device 6 is formed such that the shape of an entire operating portion that is operated to be grasped is elongated in the diametrical direction. Therefore, a pivoting position of the operation member 10 is indexed by the elongating direction. An end portion of the operation member 10 on the side of indexing the pivoting position is formed such that its shape becomes gradually thicker from the side of the other end.

Therefore, this makes to easily feel by the touch feeling as to which side of the diametrically extending direction is an indexing direction of the operation member 10. Here, in FIG. 10, the state where the operating member 10 is set to the position P1 is shown as a solid line state, and the state where it is set to the position P3 is shown as an imaginary line state. As shown in FIG. 11, according to this operating member 10, a central portion having a shape of extending in a diametrical direction is connected to the fitting portion 21 of the rotating member, and the operating member 10 is configured to be operated to pivot about this connecting portion.

In this way, by shaping the operating member 10 to have directionality by giving the shape elongated in the diametrical direction, the pivoting position of the operating member 10 can be easily felt by the touch feeling. Because this makes it easy to determine if the state is that of selecting the electric function related to the seat back 2 or is that of selecting the electric function related to the seat cushion 3, the operation for selecting the electric function can be further easily performed. Further, because the operating member 10 is shaped to be elongated in the diametrical direction, it is possible to easily apply a force for the operation of pivoting about the axis. Therefore, the switching operation of the electric function can be performed with excellent operability.

Embodiment 3

Subsequently, an electric operating device of a vehicle seat of Embodiment 3 will be explained with reference to FIG. 12. Further, in the following explanation, an explanation of portions having constitutions and operations substantially the same as those of the electric operating devices of the vehicle seats explained in Embodiment 1 and Embodiment 2 will be omitted, and different portions will be explained in detail while they are labeled with different symbols.

That is, the operation member 10 of this embodiment is also formed to have a shape elongated in the diametrical direction. According to this operation member 10, a central axis for the operation of pivoting about the axis is set at a position of an end position opposite to an end portion for indexing the pivoting position. Therefore, the indexing direction can be changed with an operation feeling same as tilting up and down the seat back 2 relative to the seat cushion 3.

Because this makes it easy to determine if the state is that of selecting the electric function related to the seat back 2 or is that of selecting the electric function related to the seat cushion 3, the operation for selecting the electric function can be further easily performed. In FIG. 12, the state of setting the operating member 10 to the position P1 is shown in a solid line state and the state of setting to the position P3 is shown in a imaginary line state, respectively.

Embodiment 4

Figure 13:
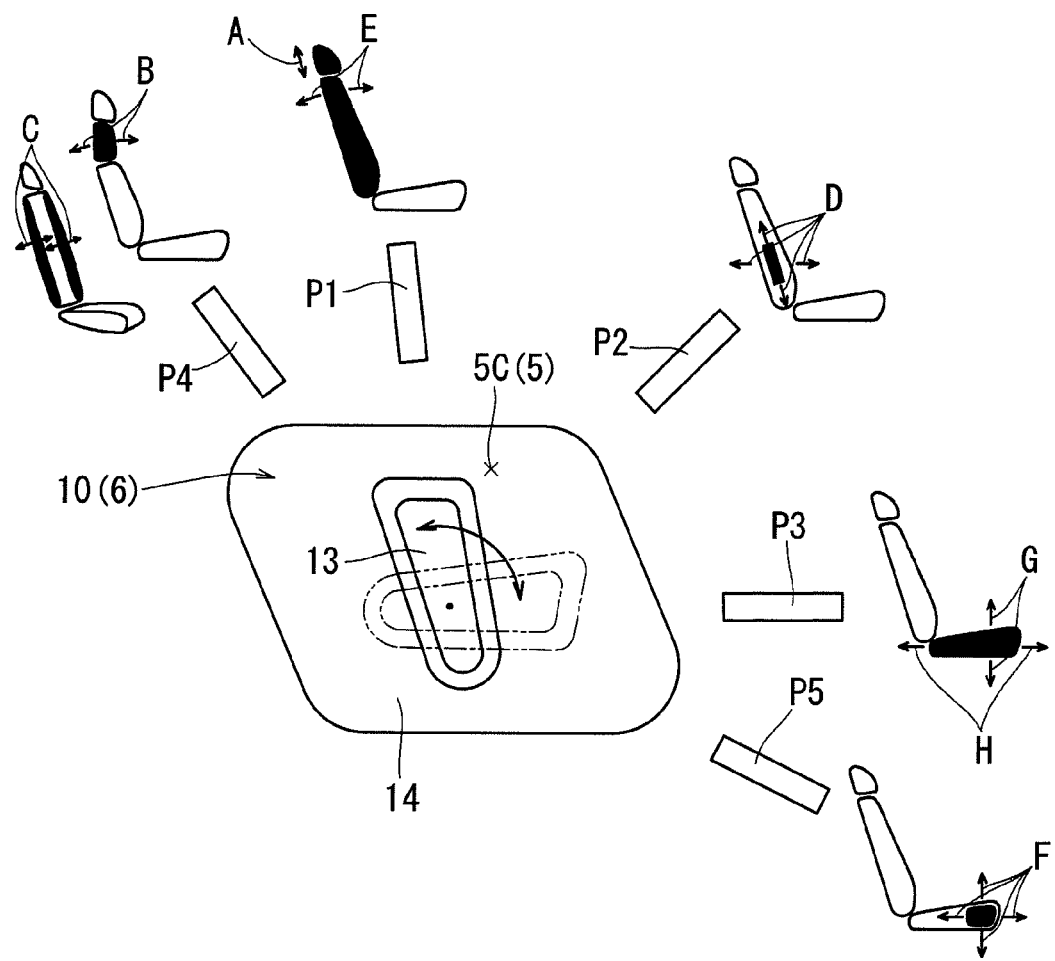
FIG. 13 is a structural view showing an electric function mode switching structure of an electric operation device of a vehicle seat of Embodiment 4.
Figure 14:
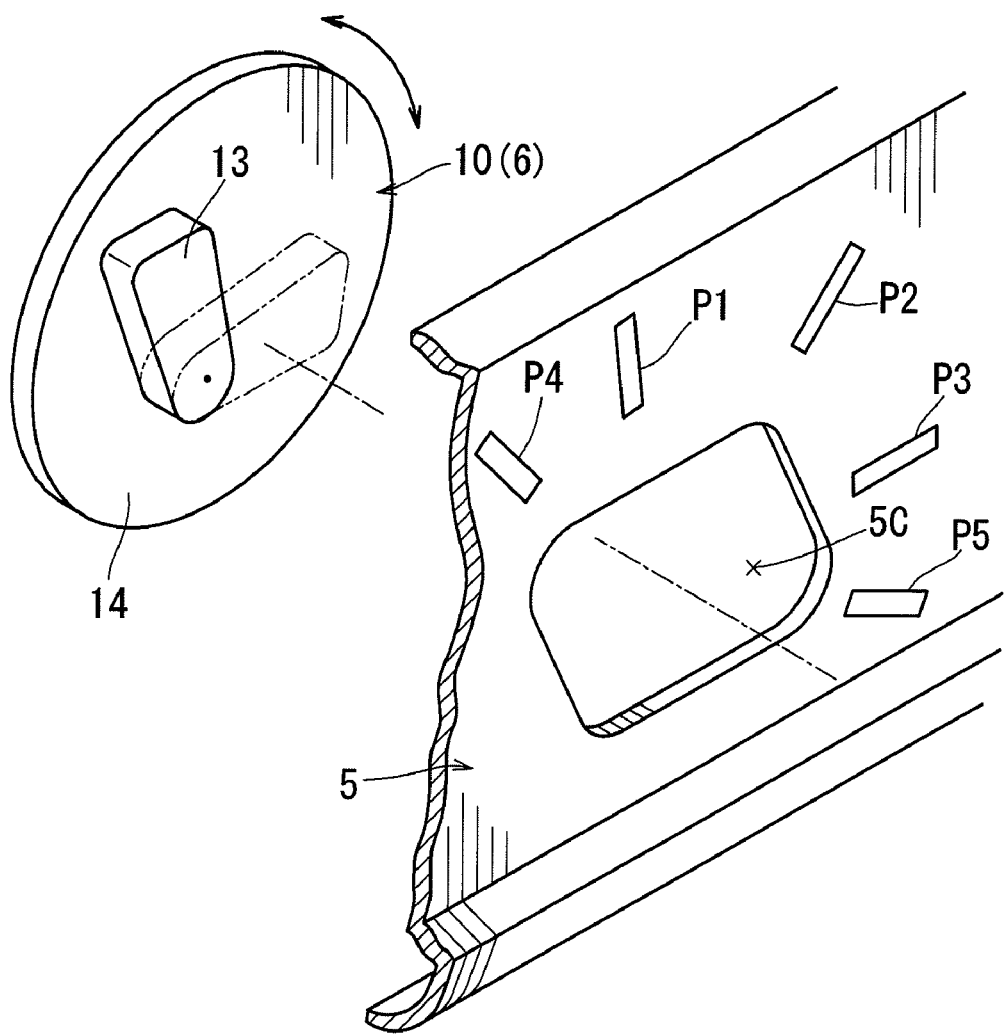
FIG. 14 is a perspective view showing a structure of assembling an operation member with a shield in an exploded view.

Subsequently, an electric operating device of a vehicle seat of Embodiment 4 will be explained with reference to FIG. 13 through FIG. 14. Further, in the following explanation, an explanation of portions having constitutions and operations substantially the same as those of the electric operating devices of the vehicle seats explained in Embodiments 1 to 3 will be omitted, and different portions will be explained in detail while they are labeled with different symbols.

An operation portion 13 of the operation member 10 operated to be grasped of this embodiment is also formed to have a shape elongated in the diametrical direction. This operation portion 13 is formed integrally on a disk-like slide plate 14. The slide plate 14 is set such that a lozenge through-hole 5c formed in a shield 5 to extend therethrough is applied from the inner side.

This makes the operating member 10 to be able to operate to pivot about the axis of the operating portion 13 while the state of covering the through-hole 5c from the outer side by the slide plate 14 is maintained. In FIG. 13, the state where the operating member 10 is set to the position P1 is shown as a solid line state, and the state where it is set to the position P3 is shown as an imaginary line state.

Although embodiments of the present invention have been explained according to the above four embodiments, the present invention can be carried out in various kinds of configurations other than the above-described embodiments. For example, with regard to the functions, such ahs the lumbar support device or the side support device, additionally used for the purpose of improving comfort, the state of use can be switched to ON/OFF without adjusting the position by the operation of slidably moving the operating member in the diametrical direction.

Further, with regard to the position adjusting functions for adjusting the back leaning angle of the seat back and the slide position in forward and rearward directions of the seat cushion, although the construction has been disclosed to operate the same direction as the direction of the operation for slidably moving the operating member, the operating directions are not necessary to be the same. However, it is necessary to note that it may become difficult to imagine the direction of the operation for movement if the operating direction and the moving direction are different from each other.

Further, in the case that an electric function having strongness and weakness in its output, such as a vibrator for massage and a heater, is provided, it may be possible to set such that the strongness and weakness in the output is adjusted in a stepwise manner by the operation for slidably moving in the diametrical direction of the operating member. Further, although there has been shown that switching of the electric function is set by five steps by the operation of pivoting the operation member about the axis, the number of the steps may be suitably set depending on the number of the electric functions provided at the vehicle seat.

Further, it is only necessary for the shape for indexing the pivoting position of the operation member shown in Embodiment 2 that the pivotal position of the operating member is felt by the feeling of grasping, and it may be possible that a part of the shape of the operating member is formed to extend in the diametrical direction for partly indexing the pivoting position.

The invention claimed is:
1. An electric operating device of a vehicle seat having a seat back and a seat cushion, comprising:
   an operation member configured to activate a plurality of electric functions and being provided at the vehicle seat such that a seated person seated on the vehicle seat can operate the operation member,
   the operation member being configured to pivot about an axis and slide in diametrical directions,
   the operation member including:
      an electric function mode switching structure configured to pivot about the axis to switch between a plurality of pivoting positions; and
      an activation control structure configured to slide in diametrical directions to switch between a plurality of slide positions,
   wherein the electric function mode switching structure includes a rotating member having a base seat portion and a fitting portion projecting from an upper surface of the base seat portion in a direction toward a fitting groove of the operation member n groove such that the electric function mode switching structure is pivotable about the axis to switch between the plurality of pivoting positions,
   wherein when the electric function mode switching structure is pivoted to one of the plurality of pivoting positions, one of the plurality of electric functions is selected for activation, and wherein when the activation control structure is slid to one of the plurality of slide positions, the selected electric function is activated.

2. The electric operating device of a vehicle seat according to claim 1,
wherein the operation member includes an index portion elongated in the diametrical direction and configured such that an indexing direction of the index portion can be felt by a touch of the seated person seated on the vehicle seat,
wherein when an electric function related to the seat back is selected, the electric function mode switching structure orients the index portion in a generally upward and downward direction of the vehicle seat so as to follow an attitude direction of the seat back, and
wherein when an electric function related to the seat cushion is selected, the electric function mode switching structure orients the index portion in a generally forward and rearward direction of the vehicle seat so as to follow an attitude direction of the seat cushion.

3. The electric operating device of a vehicle seat according to claim 2,
wherein the index portion is set as an operating portion of the operation member and is configured to be grasped.

4. The electric operating device of a vehicle seat according to claim 3,
wherein when the index portion is oriented in the forward and rearward direction of the vehicle seat, a central axis for pivoting movement about the axis of the operation member is set at a position rearwardly of a center of the operation member in the forward and rearward direction.

5. The electric operating device of a vehicle seat according to claim 4,
wherein one of the plurality of electric functions is a positioning adjusting function that is configured to allow a component of the vehicle seat to slidably move in the diametrical direction when the operating member is slidably moved in the diametrical direction.

6. The electric operating device of a vehicle seat according to claim 1,
wherein the activation control structure includes a slide member having a barrel portion and an opening portion configured such that the fitting portion of the rotating member projects through the opening portion toward the fitting groove such that the activation control structure is slidable in diametrical directions to switch between the plurality of slide positions.

7. The electric operating device of a vehicle seat according to claim 1, wherein the electric function mode switching structure is generally disposed within the activation control structure.

* * * * *